May 4, 1926.

E. S. BRADFORD 1,582,965

PLATE TRIMMING MECHANISM

Filed March 19, 1924    4 Sheets-Sheet 2

INVENTOR.
Eugene S. Bradford
BY
William M. Sivan
ATTORNEY.

May 4, 1926.

E. S. BRADFORD 1,582,965

PLATE TRIMMING MECHANISM

Filed March 19, 1924   4 Sheets-Sheet 4

INVENTOR.
Eugene S. Bradford
BY
William M. Swan
ATTORNEY.

Patented May 4, 1926.

1,582,965

UNITED STATES PATENT OFFICE.

EUGENE S. BRADFORD, OF DETROIT, MICHIGAN.

PLATE-TRIMMING MECHANISM.

Application filed March 19, 1924. Serial No. 700,314.

*To all whom it may concern:*

Be it known that I, EUGENE S. BRADFORD, a citizen of the United States, residing at Detroit, county of Wayne, State of Michigan, have invented a certain new and useful Improvement in Plate-Trimming Mechanism, and declare the following to be a full, clear, and exact description of the same, such as will enable others skilled in the art to which it pertains to make and use the same, reference being had to the accompanying drawings, which form a part of this specification.

This invention relates to apparatus for shearing to predetermined dimensions plates or packs of tin plate or other laminated material, and has for its object an improved organization of parts by means of which the slow and laborious handling of the packs incidental to the present method of trimming off but one edge at a time is accomplished. My improved mechanism not only avoids the necessity of any handling between the time that the untrimmed plate or pack is started on its course through the machine and the time when its emerges fully trimmed, but as well makes possible the accurate predetermined setting of the parts, so that, so far as the area of the sheets of the untrimmed plate or pack makes it possible, the trimmed sheets may emerge cut to definite sizes.

Figure 2:
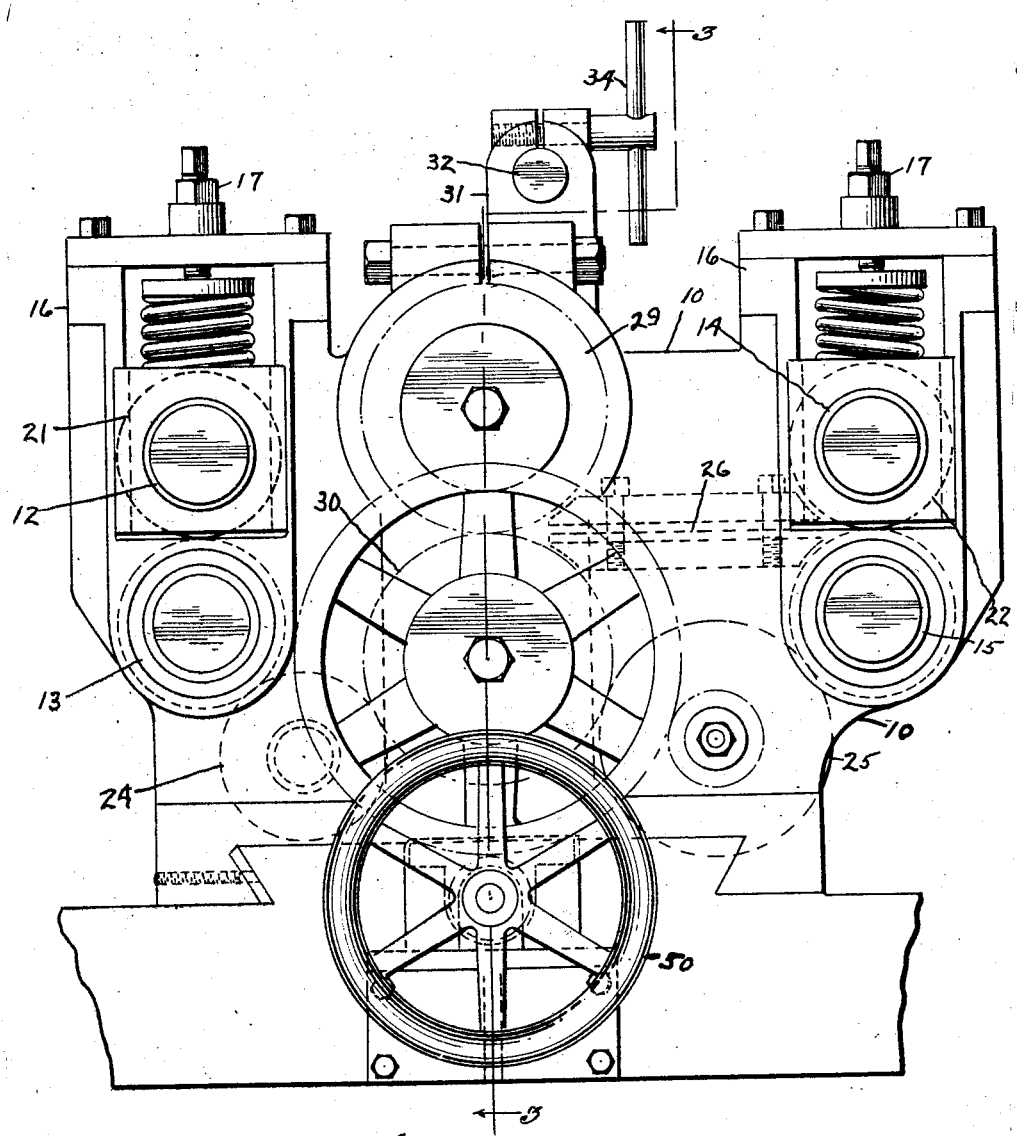
Figure 2 is an end elevational view of one of the batteries of advancing rollers and shearing members, taken along the line 2—2 of Figure 1, and looking in the direction of the arrows there shown.
Figure 3:
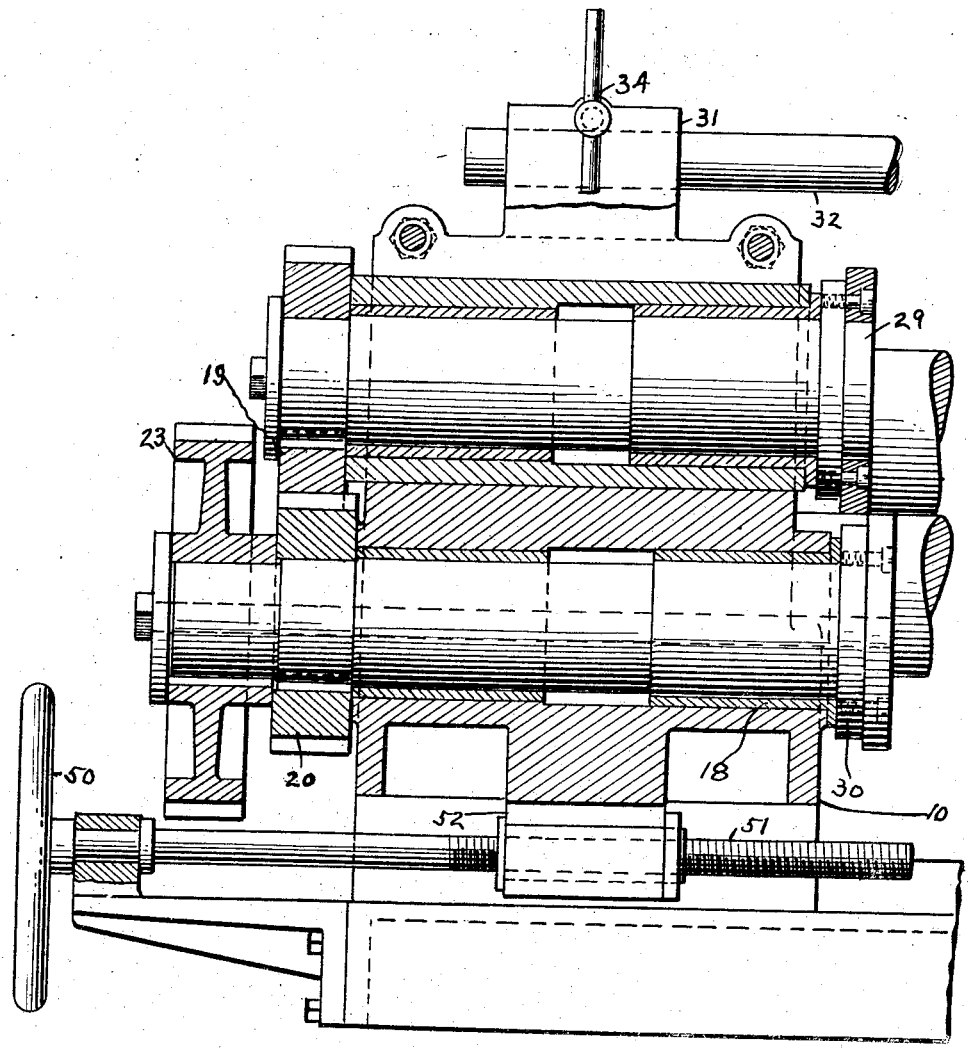
Figure 3 is a sectional elevational view taken along the broken line 3—3 of Figure 2.
Figure 4:
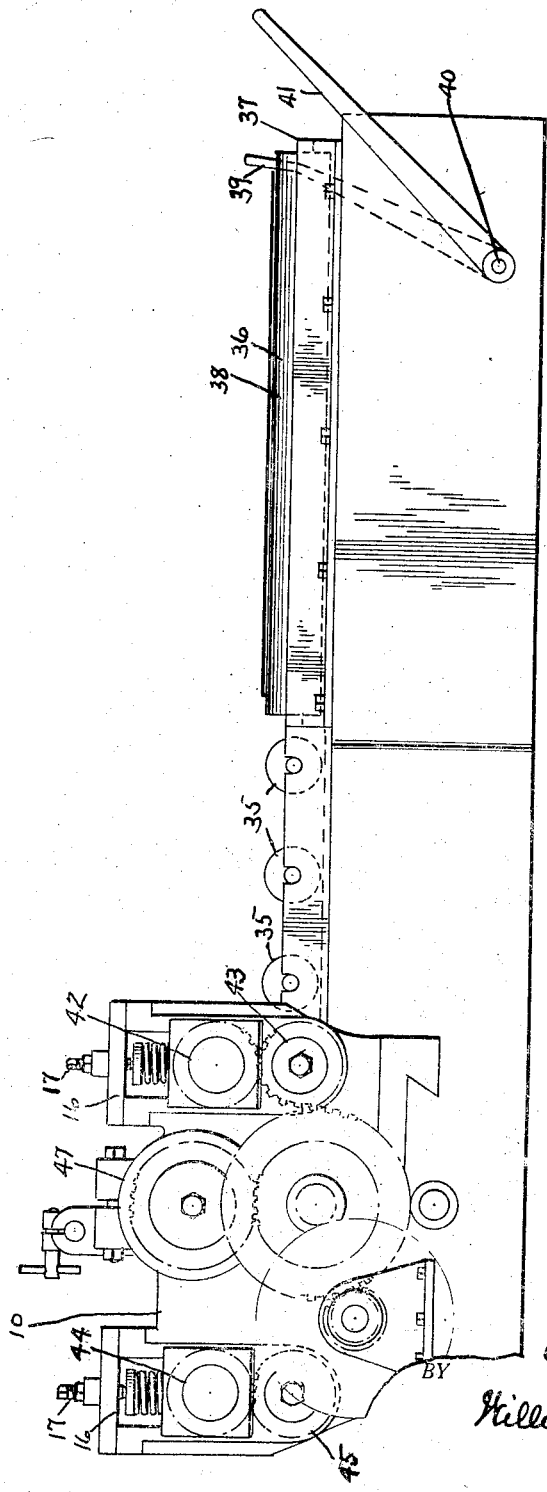
Figure 4 is a partly sectional elevation taken along the line 4—4 of Figure 1.

11 represents a grated platform or support, upon which the plates or packs of metal sheets are placed for frictional advancing engagement by the first one 12 of the advancing rollers, which extends spacedly thereover, and, as brought out in Figure 2, is capable of vertical adjustment according to the thickness of the pack. Beneath the roller 12 and its companion roller 14 there are preferably located feed rollers 13 and 15, the pack resting upon the feed rollers 13 and 15 as it advances. Each of the advancing rollers 12 and 14 may, if desired, be provided with yieldable box bearings 16, whose tension is regulated by crowning nuts 17.

Before the plate or pack reaches the second set of rollers 14 and 15, its lateral edges encounter the shearing members 19 and 20, and 29 and 30, arranged in vertically positioned pairs on either side of the path of travel of the plate or pack, which have been previously adjusted to provide between them the space desired for that dimension of the pack when trimmed. Both the shearing members and the advancing rollers are rotatably journaled in the head 10, and may be actuated in any desired manner as for example by gear wheels 21, 22, 24 and 25 driven from a gear wheel 23, or electrically. Provision is made by means of a sleeve 27 through which the shaft 28 of the upper cutter members passes, for shortening or lengthening the effective distance apart of the two sides from one another, according to the width of sheet that it is desired to cut; and when the desired position of the parts has been attained, they are clampingly secured against movement by tightening by means of the hand wheel or screw 34 of the cut sleeve 31 which engages about one end of the bridging rod 32, whose other end is anchored to the other side of the frame of the machine at 33. After the trimming of the lateral edges of the pack or plate has been effected by the shearing members 19 and 20 and 29 and 30, the plate or pack, before passing between the second set of rollers 14 and 15, passes between the guides 26, which are spaced just the proper distance apart and serve to rigidly though slidably hold the plate or pack, as it progresses further, in the straight line course desired. The lower ones 20 and 30 of the cutter members are preferably mounted on a sleeve 18, lengthwise of which they are limitedly adjustable to take up whatever slack in their registry with their corresponding members 19 and 20 may result from continued use. And the entire head 10 which carries the several rolling and cutting elements may be adjusted to and fro, according to the desired position of cut desired, by the actuation of the hand wheel 50 on the threaded shaft 51, which engages through a complementarily threaded projection 52 of the head.

When the pack or plate has passed the set of cutter members and guides and is projected beyond the advancing roller 14 by the continued rotative movement thereof, it proceeds along the roller-surfaced guide platform 37 until its forward end engages the stop 38; its far edge (in the position shown in Figure 1) is then engaged by upwardly projecting fingers 39 which alternate with the supporting rollers 36, and which are mounted on shaft 40, which is rotatably journaled in the frame of the machine, which shaft may be rocked in any desired manner, as for example by manual or pneumatic actuation of the lever 41. This results in causing the travel of the pack or plate transversely of its path of travel hitherto, and it soon encounters the supporting rollers 35, which are similar in their function and subjacent position to the rollers 36 just described, and the now forward edge of the partly sheared pack or plate, that is, the edge opposite to that engaged by the fingers 39, is frictionally engaged by the first one of the second series of advancing rollers 42 and 44, each of which, similarly to the advancing rollers 12 and 14, have immediately beneath them the feed rollers 43 and 45. The action of the advancing roller 42 serves to advance the plate or pack further and into the range of the cutter members 46 and 47, which engage each side of the hitherto uncut side of the pack; the action of these cutters and the arrangements for their adjustment as to width, and as to locating, is the same as that already described as to the first group or series of advancing and trimming elements, each group or series of roller and cutter members being preferably driven from a separate motor or pulley. When the plate or pack has passed this second pair of cutter members and the guides 53, it is frictionally engaged by the second one of the advancing rollers 44 and its feed roller, and projected out on to a receiving platform (not shown) at the right end of the lower edge of Figure 1, there to be removed by attendants, or mechanically, for packing and shipping.

Figure 1:
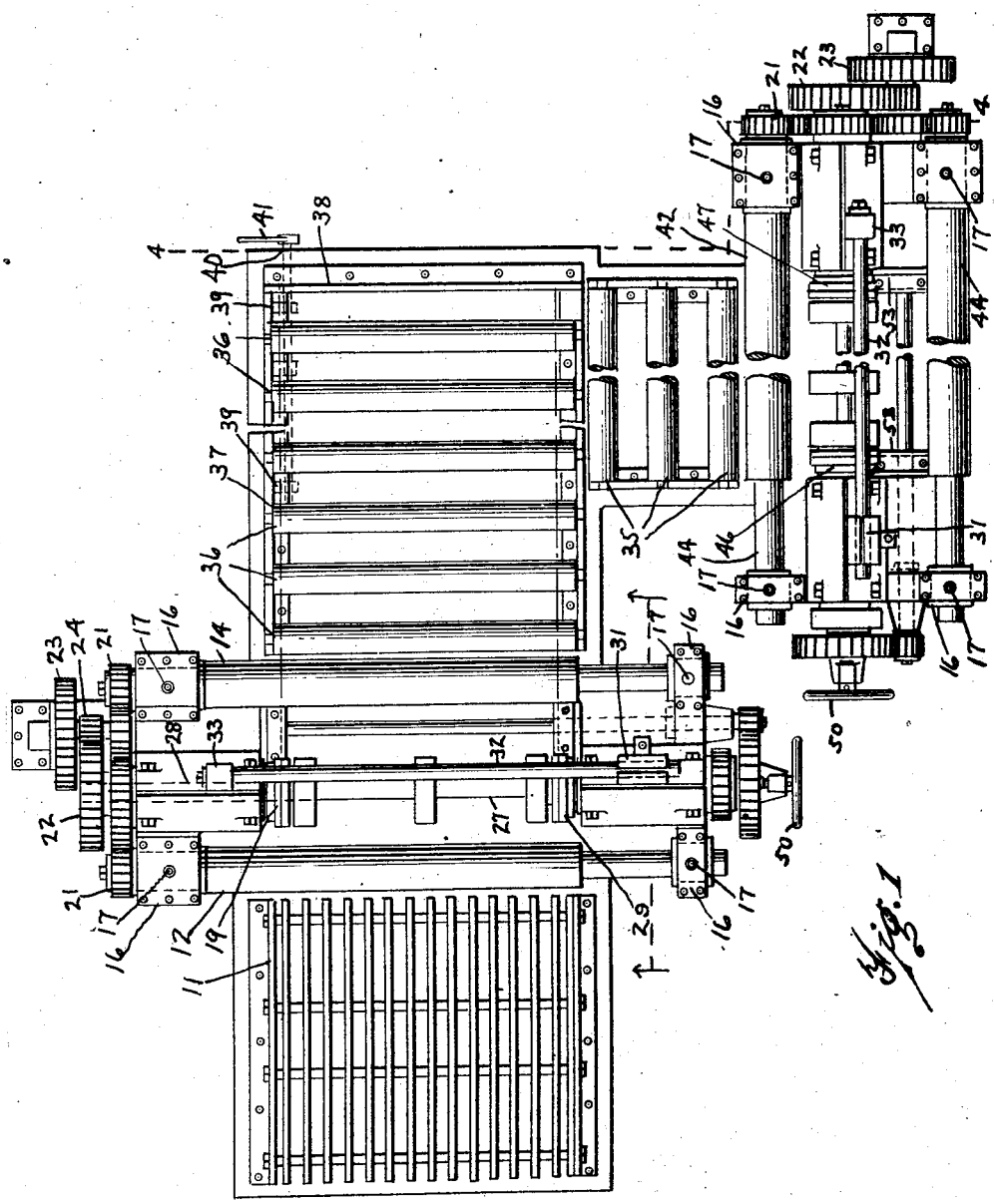
Figure 1 is a plan view of my improved device.

I have indicated, by the broken line showings of the second series of advancing and cutting elements in Figure 1, the quite obvious possibility of making these elements of whatever width may be desired according to the size of packs expected to be cut; this would be of course equally applicable to the first described unit as well.

What I claim is:

1. A pack-trimming mechanism, having, in combination with a set of advancing and edge-trimming members past which an inserted pack is adapted to travel in a substantially horizontal plane, means for varying the space between said edge-trimming members on either side of the path of travel of the pack, means for halting the travel of the pack at a predetermined point thereafter, externally actuatable means for starting the further travel of the pack in a transverse direction to the path previously traveled by it, and a second set of advancing and edge-trimming members whose axes are positioned substantially perpendicularly to those of the first set, whereby the trimming of the edges of the pack is completed.

2. In combination with a plurality of groups of elements for advancing and laterally trimming a pack fed thereinto, the component members of each group being positioned axially perpendicularly to those of the other group, means for varying the axial distance between the component members of each pair of cutters flanking the path of travel of a pack, externally actuatable means positioned to engage the pack after it has been acted upon by the members of the first group to cause its travel into the operative range of the members of the second group.

In testimony whereof, I sign this specification.

EUGENE S. BRADFORD.